Oct. 8, 1968    J. A. HOLMES    3,404,597

APPARATUS FOR FILLING CARTRIDGE TUBES

Filed July 28, 1967    2 Sheets-Sheet 1

INVENTOR
JOHN A. HOLMES

BY Cushman, Darby & Cushman
ATTORNEYS

Oct. 8, 1968   J. A. HOLMES   3,404,597
APPARATUS FOR FILLING CARTRIDGE TUBES
Filed July 28, 1967   2 Sheets-Sheet 2

INVENTOR
JOHN A. HOLMES

BY
Cushman, Darby & Cushman
ATTORNEYS

United States Patent Office 3,404,597
Patented Oct. 8, 1968

3,404,597
APPARATUS FOR FILLING CARTRIDGE TUBES
John Alexander Holmes, 532 N. James St.,
Peekskill, N.Y. 10566
Filed July 28, 1967, Ser. No. 656,875
4 Claims. (Cl. 86—45)

ABSTRACT OF THE DISCLOSURE

A cartridge feed tube loader provided with a hopper and a base which are joined together in spaced relation. Cartridge feed tubes are placed intermediate the hopper and the base in axial alignment with apertures in the bottom of the hopper. By agitating the loader, empty cartridge casings in the hopper pass through the apertures into the cartridge feed tubes with the heavy closed end of the cartridge casings entering the apertures first.

Brief description of the invention

This invention relates to an apparatus for loading cartridge feed tubes, which are used on ammunition loading machines, and, in particular, to an apparatus which greatly simplifies and speeds up the process for filling cartridge feed tubes while insuring that the casings are introduced into the tube in the proper manner.

The cartridge feed tube loader of the present invention comprises a hopper which is secured in vertical-spaced relation to a base. The hopper has a hollow cylindrical portion, an intermediate hollow frusto-conical portion and a bottom portion. The bottom portion is provided with apertures and has bosses on its lower surface with bores therein which are axially aligned with the apertures in the bottom of the hopper.

The base is provided with a plurality of circular depressions which are aligned with the bores and apertures of the hopper. The bores in the bosses and the complementary depressions in the base maintain the cartridge feed tubes in axial alignment with the apertures in the hopper while the cartridge casings are being loaded. To load the cartridge casings, one merely has to insert the tubes into the apparatus; fill the hopper with the cartridge casings; and agitate the apparatus slightly. The agitation causes the cartridge casings to pass through the apertures of the bottom portion, heavy end first, thereby insuring proper alignment of the casings within the tubes.

The invention comprises a durable loading apparatus which can be made of plastic or other suitable materials. The loader is both inexpensive to manufacture and easy to use. The time required for loading five tubes with the present invention is approximately one-thirtieth (1/30) of the time required to load the same number of cartridge feed tubes by hand.

In addition, the present invention insures that the cartridge casings are properly disposed within the tubes. When loading by hand, casings are sometimes inadvertently placed in the tubes upside down and the tubes must be reloaded.

Figure 1:
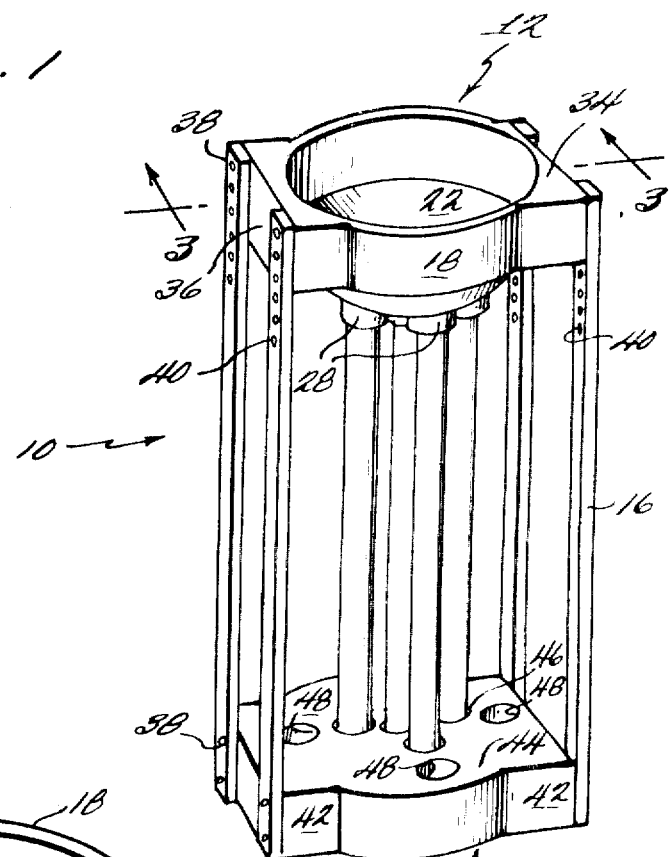
Figure 2:
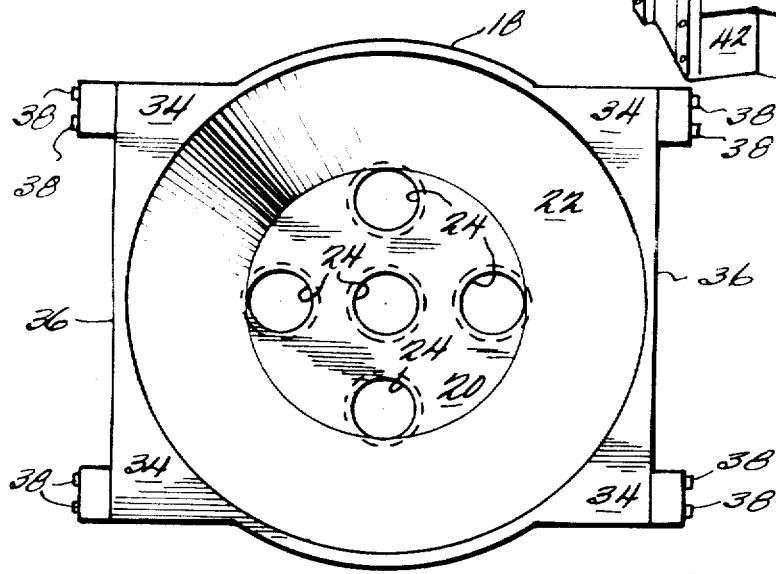
Figure 3:
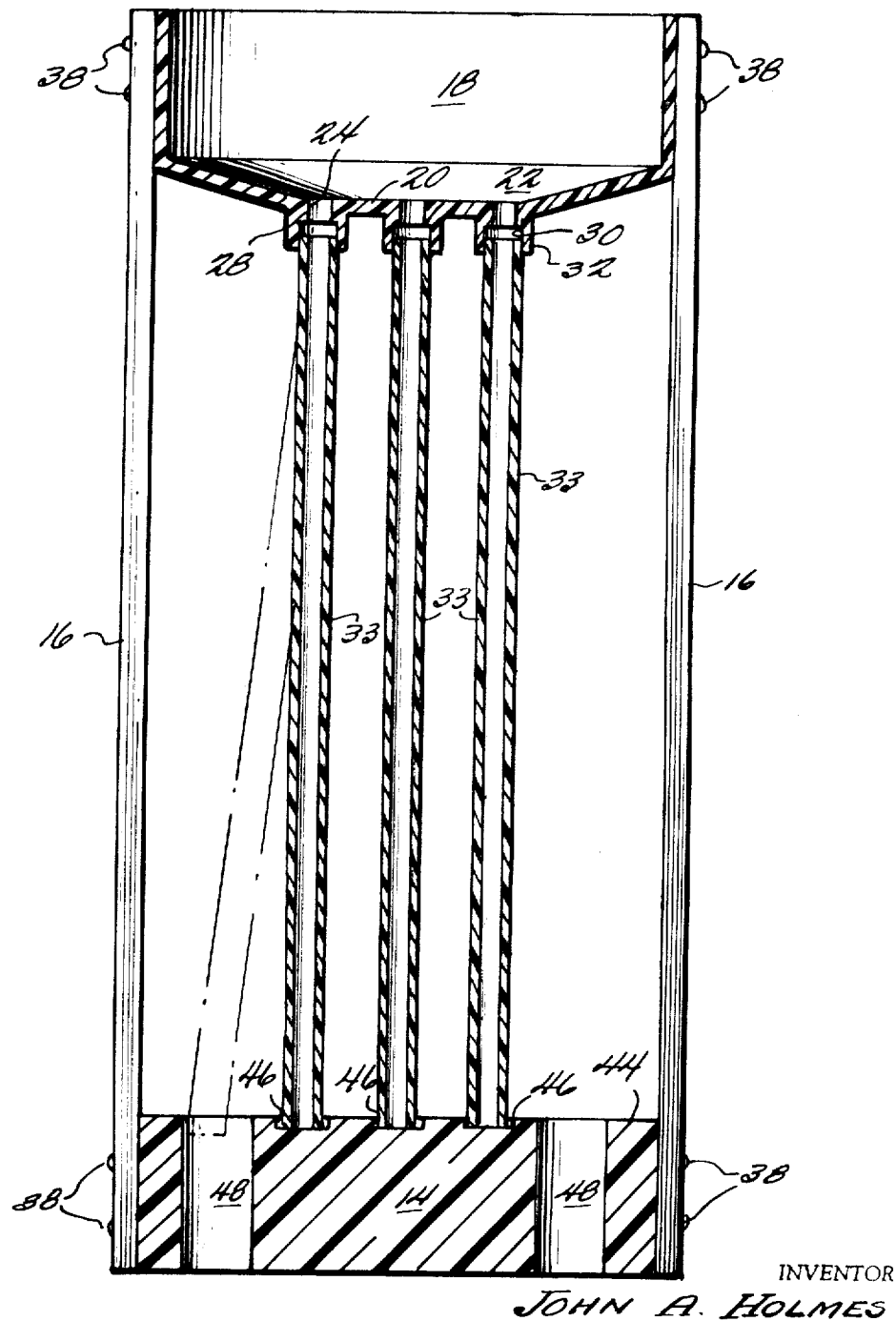

Further advantages of the present invention will become more apparent from the following disclosure when taken in combination with the accompanying drawings in which:

FIGURE 1 is a perspective view of the cartridge tube loading apparatus;
FIGURE 2 is a plan view of the hopper; and
FIGURE 3 is a sectional view taken along lines 3—3 of FIGURE 1.

Detailed description of the invention

Referring to FIGURE 1, reference character 10 generally indicates the cartridge feed tube loading apparatus of the present invention. The apparatus comprises a hopper 12, a base 14 and legs 16 which secure the hopper to the base.

The dimensions set forth in this specification are merely exemplary and serve only to define the relative sizes of the various elements. It is contemplated that the dimensions of the various elements and apertures in the loader can be altered to suit the particular cartridge casings being loaded.

In the preferred form, the hopper comprises an upper hollow cylindrical portion 18, a flat bottom portion 20 and an intermediate hollow frusto-conical portion 22. The upper hollow cylindrical portion 18 is approximately 12 inches in diameter by 4 inches in depth. The hollow frusto-conical portion 22 extends inwardly from the lower edge of the cylindrical portion to the circular flat bottom portion 20 which is 6 inches in diameter and spaced 1 inch below the lower edge of the cylindrical portion.

The flat bottom portion 20 is provided with a plurality of holes 24. The holes are nine-sixteenths (9/16) of an inch in diameter with one hole being centrally located in the flat bottom portion and four other holes being located around the circumference of the flat bottom portion. The four other holes are equally spaced around the circumference of the bottom portion 20 with the circumference of each hole contacting the circumference of the flat bottom portion at its juncture with the frusto-conical portion 22.

Cylindrical bosses 28 are positioned on the underside of bottom portion 20. The bosses extend approximately one inch below the underside of the hopper and are provided with apertures 30 which are axially aligned with and communicate with the holes 24 in the bottom portion 20. The apertures 30 in the bosses are rebored to a diameter of three-quarter (3/4) of an inch for a depth of three-quarters (3/4) of an inch thereby forming collars 32 on the underside of the hopper. These collars are utilized to position cartridge feed tubes 33 in axial alignment with the apertures in the bottom portion of the hopper as will be explained hereinafter.

As best shown in FIGURE 2, the hopper 12 is provided with four integral bosses 34 which protrude outwardly from the hollow cylindrical portion 18. These bosses form flat surfaces 36 to which are affixed four plastic legs or braces 16. In the preferred form, legs 16 are made from one by two inch plastic stock and are secured to the bosses 34 by means of screws 38 or other similar means. The length of the legs may be varied, with the particular length of the legs to be used in a certain operation being governed by the lengths of the feed tubes used.

In the preferred form, each leg is provided with a plurality of holes 40 for receiving screws 38. The holes in each leg are located in the same position relative to the bottom of the leg as are the holes of the other legs so that the hopper is level in any position selected. In this manner, the height of the hopper above the base can be adjusted without having to change the legs.

The bottom portions of legs 16 are secured by screws 38 to bosses 42 of base 14. Bosses 42 are similar to bosses 34 of the hopper and are positioned on the base directly below bosses 34 so that legs 16 extend vertically between the hopper and the base.

The base comprises a solid cylindrical element having a diameter of 12 inches and a depth of 4 inches. The upper surface 44 of the base is provided with a plurality of depressions 46 which are aligned axially with the holes 24 in the bottom of the hopper. The depressions are approximately one-eighth (1/8) of an inch deep and seven-eighths (7/8) of an inch in diameter and provide a means for aligning and retaining the bottoms of cartridge feed tubes 33 in the loader once the tubes are inserted in collars 32.

Holes 48 are located in the base adjacent each of the four outer depressions 46. These holes are one and one-quarter (1¼) inch in diameter and pass entirely through the base member. The purpose of holes 48 is to allow tubes 33 to be lowered so that the upper ends can be more easily removed from the collars 32 after the tubes have been loaded.

In operation, the operator places the device on its base 14 and puts five standard cartridge feed tubes 33 of whatever caliber the unit has been adjusted to accept into the tube collars 32 located on the bottom of the hopper. The lower portions of the tubes are then slid across the upper surface of the base and into the depressions 46 which are aligned with the respective collars. In this way, the tubes are properly aligned with the holes in the bottom of the hopper. The operator then pours any number of empty cartridge cases into the hopper and proceeds to agitate the apparatus. A slight agitation of the apparatus automatically lines up the cartridges, which are smaller in diameter than holes 24, so that they slide down the tubes in the proper position for loading, that is with the heavy closed end of the cartridge facing downwardly.

When all of the tubes are full, the operator removes the excess cartridge casings from the hopper and then removes the tubes from the apparatus. To do this, the operator first pulls up on a tube and then slides the bottom of the tube outwardly until it is aligned with one of the holes 48. The tube is then lowered into hole 48 whereby the upper end of the tube comes out of the collar 32.

Of course, the apparatus may be used with tubes which are either open or closed at their lower ends. The outside diameter of tubes 33 must be less than the inside diameter of apertures 30, with the relative diameters of the tubes 33 and apertures 30 depending upon the flexibility of tubes 33 when loaded with the cartridge casings. The more flexible the tube, the closer to fit allowed between the outer surface of the tube and the inner surface of aperture 30. With a more rigid tube, the fit must be somewhat looser to allow the tube to be cocked at an angle as shown in phantom line in FIGURE 3.

While the preferred form of the invention has been shown and described, it is to be understood that all suitable modifications and equivalents may be resorted to which fall within the scope of the invention as claimed.

What is claimed is:

1. A cartridge feed tube loader comprising a base, a hopper for holding empty cartridge casings, means securing said hopper to said base with said hopper being vertically spaced above said base, said hopper having apertures therein passing from the interior of said hopper to the underside of said hopper, said underside of said hopper having depressions therein, said depressions being axially aligned with said apertures and having greater diameters than said apertures, said base having depressions therein, said depressions of said base being axially aligned with said depressions in said hopper and having greater diameters than said apertures in said hopper, readily removable cartridge feed tubes carried by said depressions in alignment with said apertures so that upon agitation of said loader empty cartridge casings can pass from said hopper through said apertures into said cartridge feed tubes, said readily removable cartridge feed tubes being slidably received within said depressions and having lengths less than the distance between end walls of said depressions wherein by raising and tilting said feed tubes, they can be readily removed from said loader.

2. The cartridge feed tube loader of claim 1 wherein the hopper comprises an upper hollow cylindrical portion, a flat bottom portion and an intermediate hollow frusto-conical portion which interconnects said hollow cylindrical portion with said flat bottom portion.

3. The cartridge feed tube loader of claim 2 wherein one of said apertures is centrally located on the bottom of the hopper and wherein other of said apertures are tangential to the juncture of said bottom and the hollow frusto-conical portion.

4. The cartridge feed tube loader of claim 1 wherein said base is provided with a plurality of vertically extending apertures, said apertures having diameters greater than the diameters of the cartridge feed tubes whereby said cartridge feed tubes can be lowered into said apertures to facilitate removal of said cartridge feed tubes from said loader.

References Cited

UNITED STATES PATENTS

| | | | |
|---|---|---|---|
| 1,275,581 | 8/1918 | Macomber | 86—45 |
| 2,621,096 | 12/1952 | Broyles et al. | |
| 2,714,832 | 8/1955 | Seed et al. | 86—45 |
| 3,128,668 | 4/1964 | Dicken | 86—45 |

BENJAMIN A. BORCHELT, *Primary Examiner.*

G. H. GLANZMAN, *Assistant Examiner.*